Figure 1:
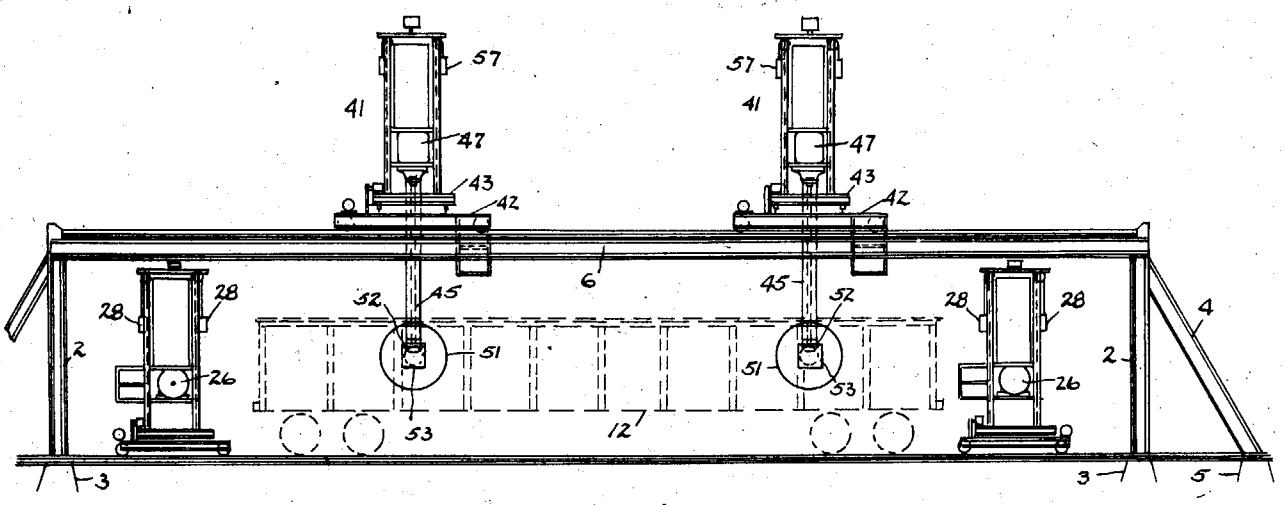

Sept. 27, 1927.

W. S. DIETRICH

SAWING APPARATUS AND METHOD

Re. 16,747

Original Filed July 24, 1926

3 Sheets-Sheet 1

INVENTOR.

William S. Dietrich

BY

Day, Oberlin & Day

ATTORNEYS.

Sept. 27, 1927. W. S. DIETRICH Re. 16,747

SAWING APPARATUS AND METHOD

Original Filed July 24, 1926 3 Sheets-Sheet 2

INVENTOR.
William S. Dietrich
BY
Fay, Oberlin & Fay
ATTORNEYS

Sept. 27, 1927. W. S. DIETRICH Re. 16,747

SAWING APPARATUS AND METHOD

Original Filed July 24, 1926 3 Sheets-Sheet 3

INVENTOR.
William S. Dietrich
BY
Fay, Oberlin & Fay
ATTORNEYS

Reissued Sept. 27, 1927. Re. 16,747

UNITED STATES PATENT OFFICE.

WILLIAM S. DIETRICH, OF GREENVILLE, PENNSYLVANIA, ASSIGNOR TO THE GREENVILLE STEEL CAR COMPANY, OF GREENVILLE, PENNSYLVANIA, A CORPORATION OF PENNSYLVANIA.

SAWING APPARATUS AND METHOD.

Original application filed July 24, 1926, Serial No. 124,616. Divided and application filed October 30, 1926, Serial No. 145,351. Original No. 1,631,927, dated June 7, 1927. Application for reissue filed July 23, 1927. Serial No. 208,606.

This invention as indicated relates to a sawing apparatus and method, and is a division of my application, Serial No. 124,616, filed July 24, 1926, (Patent No. 1,605,816). More particularly it comprises a method of reducing structures of metal plate, wood or composition, or the combination thereof, to sections of predetermined size, and an apparatus especially adapted for cutting such structures to such sizes. It is particularly adapted for reducing to scrap obsolete metal car bodies and the like. Certain features of the invention, as will be noted, are of general application and it is not intended to limit such features to the particular constructions shown and described. This method makes use of the supporting and bracing members of the car body to hold the parts operated upon rigid as the top and peripheral sections are first severed and thereafter intermediate sections and the bottom sections are severed in turn.

Heretofore it has been the practice in reducing obsolete metal railroad car bodies to suitable scrap size to have the operations carried on by a large crew of workmen equipped with suitable cutting devices such as acetylene torches and power drills and compressed air rivet cutters and knockout devices. Such operations require large crews and extensive working space. The time consumed in such operations has been found in many instances to be excessive and the expenses of producing scrap metal have been greater than the value of the material so reduced.

The principal object of the present invention is to obviate the disadvantages referred to and to provide a method and an apparatus which will be extremely economical in operation and which will permit the reduction of such article to predetermined size with a minimum of effort and expense. Another object of the invention is to provide an apparatus particularly adapted to reduce metal railroad car bodies, particularly those of the gondola type to scrap of charging box size with the elimination of rehandling operations. Another object of the invention is to provide a method which may be carried out by an apparatus which may be transported to such localities as are used for the storage or rehabilitation of metal railway cars, for use in clearing up the obsolete material at such point with a consequent saving of large expense for transportation of such material by reason of its highly concentrated form. Other and further objects of the invention will appear in the course of the following description. To the accomplishment of the foregoing and related ends, said invention, then, consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

Figure 2:
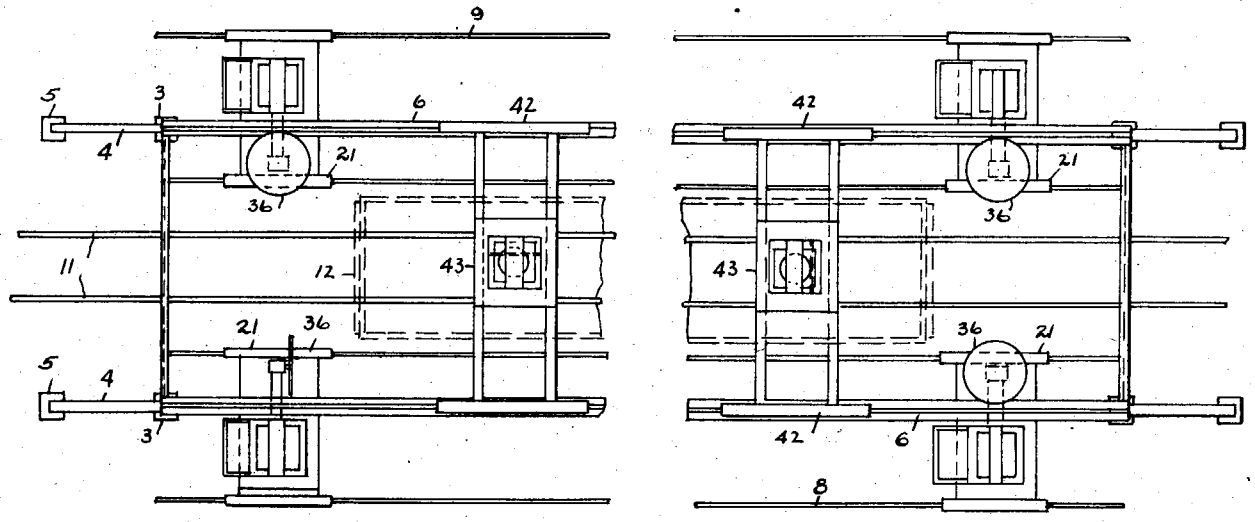
Figure 3:
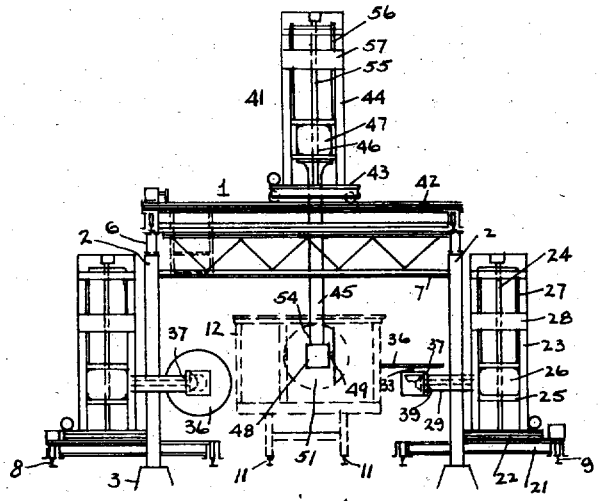
Figure 4:
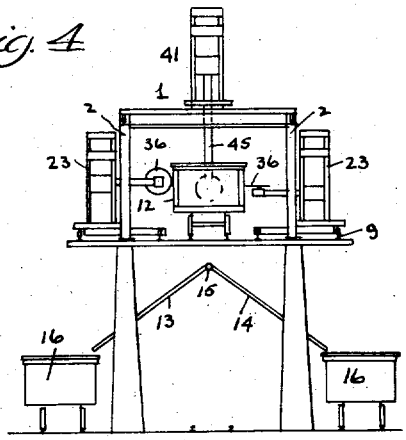
Figure 5:
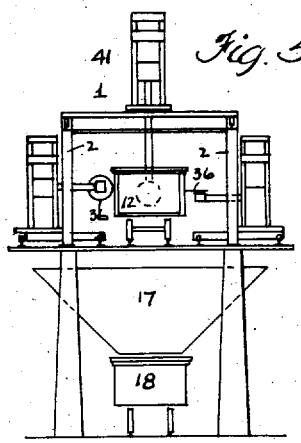
Figure 6:
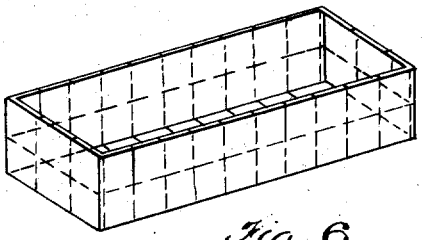

In said annexed drawings:

Fig. 1 is a side elevation showing an apparatus constructed in accordance with the principles of my invention with a gondola railway car shown in dotted lines within the same; Fig. 2 is a top plan view of the apparatus shown in Fig. 1; Fig. 3 is an end elevation of the apparatus shown in Figs. 1 and 2; Fig. 4 is an end view of an apparatus similar to Fig. 3, but showing in addition the apparatus for loading scrap cars; Fig. 5 is a view similar to Fig. 4 but showing a modified form of loading device; and Fig. 6 is a perspective view of a car body showing the method of separating the same into plates of charging box size.

As is clearly shown in the drawing, the apparatus comprises a super-structure 1 comprising standards 2, mounted on suitable pedestals 3 and braced by inclined members 4 supported upon additional pedestals 5. At the upper ends of said standards, longitudinally extending track-ways 6 are provided upon which overhead and inside sawing units, presently to be described, are adapted to be movably supported. Transverse frame members 7 may be provided adjacent the ends of said track-ways.

Other track-ways 8, 9 for lateral and end sawing units are provided parallel to said longitudinal track-ways, but on a plane at a point approximately even with the heads of the supporting pedestals. Such track-ways may be directly supported from the ground or may be mounted upon a platform provided at the tops of the pedestals and supported thereon. A central track-way 11 of standard railroad gauge is provided in order that a railroad car 12 of the type referred to may be moved within the apparatus. The two outer track-ways are of broader gauge and are adapted to movably support the lateral sawing units.

The apparatus may be operated at the ground level, but it has been found desirable to have the sawing units and the object operated upon at an elevated position so as to provide for the automatic disposal of the severed sections without rehandling. This is accomplished by means of a scrap plate distributing apparatus, which may be of any desired construction, but it has been found that by hinging a pair of longitudinally extending plates 13, 14, beneath the object operated upon with a hinged support 15 for said plates positioned centrally at an elevated position and the outer ends of said plates projecting to a point above scrap cars 16, as is shown in Fig. 4, that no intermediate handling operations are necessary, as the plates, as soon as severed from the car body, will be carried by gravity into the scrap cars. The scrap cars, as shown, are mounted on standard gauge track-ways outside of the pedestals.

In the form of construction shown in Fig. 5, a large metal hopper 17 is provided beneath the elevated platform and a scrap car 18 on a standard gauge track between the pedestals is adapted to be moved beneath the open end of said hopper for the reception of the scrap plates as they are severed. The individual sawing units, as is clearly shown in Figs. 1, 2 and 3 of the drawing, are of two forms of construction. In one form, adapted to be used as a side sawing apparatus, the saws are carried on arms projecting laterally from said units, while in the other form of construction the saws are carried on arms depending vertically from said units.

In the first form of units, a longitudinally traveling carriage 21 is provided upon which a transversely traveling carriage 22 is mounted. A vertical frame work 23 is secured to said transversely traveling carriage and embodies in its construction a worm 24 mounted within the same and engaging a movable frame 25 upon which a saw driving motor 26 is supported. Cables 27 are connected with said motor supporting platform and at their opposite ends are attached to a counterweight 28 with a view of permitting the vertical adjustment of said motor and its associated mechanism to be made with a minimum of effort. A laterally extending arm 29 is connected with the motor supporting frame, said arm forming a housing for the motor drive shaft 31. At the outer end of said housing, a swiveling head or rotatable gear housing 32 is mounted within which the saw mandrel 33 is rotatably supported. Beveled gears 34, 35, on the respective ends of the drive shaft and the saw mandrel provide for the transmission of power, and permit the free movement of said swiveling head.

At the end of the saw mandrel, a large friction saw 36 of the high speed type, is supported. The saw may be turned to any position about said supporting arm, inasmuch as the drive is through beveled gears as stated. The saw ordinarily is intended to cut only in two positions, vertically and horizontally, and a locking device 37 is provided whereby the rotating gear housing may be firmly secured to the lateral extending arm in each of said two positions.

The sawing unit 41 supported upon the longitudinal beams for overhead or inside sawing, comprises a longitudinally travelling carriage 42 upon which a transversely travelling carriage 43 is mounted which supports a frame 44 identical with the framework heretofore described, forming a part of the side sawing units. In place, however, of a laterally extending arm, a downwardly extending arm 45 is provided, said arm forming a housing for the drive shaft 46 from the saw driving motor 47. At the end of said drive shaft, a swivelling head or a rotatable gear housing 48 similar to that heretofore described, is mounted, said gear housing carrying a saw mandrel 49 upon the end of which a friction saw 51 is supported. Bevelled gears, 52, 53, connect said mandrel with said drive shaft, and locking means 54 is provided for holding said saw in either a transverse or longitudinal plane. The overhead or inside sawing unit is likewise provided with an adjusting worm 55 for moving a motor platform and has cables 56 and a counterweight 57, similar to those of the side sawing units.

Motors are provided for moving through suitable driving mechanism, the longitudinal and transversely moving carriages and for turning the worm shaft. The motors are preferably electric motors and controller boxes are provided at suitable positions.

For sawing metal railroad cars of the gondola type, it has been found desirable to provide two side sawing units on each side of the apparatus and two overhead or inside sawing units. Such arrangement permits ample room for the operators of the units and reduces the time of operation one-half for each pair of such units.

The preferred method of operation in reducing a gondola car to scrap plates, preferably of charging box size, is diagrammatically indicated in Fig. 6 and comprises making vertical cuts adjacent one end and the center of each side at approximately the same time by means of respective side units, and at the ends by the respective end sawing units, and then a series of such cuts progressively. The vertical cuts are preferably made first for half the depth of the gondola car and at suitable spaced intervals to provide plates of standard charging box width. When the vertical cuts have been made from the top edge of the car to a position approximately midway thereof, the side saws are turned at right angles, from a vertical to a horizontal position, and the horizontal cuts are then made through the sides and ends at a distance to provide plates of standard charging box lengths, the plates being dropped in rapid succession as they are severed from the car body into the hoppers or the distributing means disclosed in Figs. 4 and 5 and moving thence by gravity into the scrap cars. Workmen may be stationed at suitable points to assist in the distribution of the scrap and loading of the cars. After the upper portions of the side and end walls of the cars have been severed, the process is repeated with respect to the lower half of said side and end portions. The transversely moving carriages are moved in on their respective track-ways so as to position said saws adjacent the ends of the car body when said side units make the horizontal cuts across the respective ends.

The overhead and inside sawing units are then moved transversely and longitudinally, as soon as the sides and ends are removed, to sever the marginal portions and then the central portion of the bottom of the car body into plates of suitable size. The marginal or transverse cuts in the bottom may also be made by the side sawing units if desired.

After the car bodies have been reduced to scrap, the supporting frame and running gear may be dismantled or such parts may be moved to another position and salvaged as may seen proper.

The reduction of car bodies to scrap plates, as has been stated, has been an operation conducted in many instances at a loss because of the heavy costs for labor and the extended space required for carrying on such operations. By the use of an apparatus which reduces a car body to scrap within a space of approximately 20 minutes and with a crew of not over six operators, such operations, in many instances, may be carried on at a profit.

The provision of swiveling heads for supporting the saws makes it possible to operate with fewer units and requires less space. The carriages as stated may be moved longitudinally and transversely by any desired mechanical means but are preferably driven by electric motors. They may be solidly anchored at such positions by suitable clamping or braking mechanism, such as track gripping clamps of well known construction. When so adjusted, the proper motors are driven to move the saws vertically or longitudinally as the cutting progresses in the manner heretofore stated.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. An apparatus of the character described having in combination a trackway above which a unit of railway rolling stock to be operated on may be retained in position principally by its own weight, a trackway extending parallel to said first-named trackway, a high speed friction saw unit movably mounted on said last-named trackway, and means for traversing said saw at right angles to said second trackway.

2. An apparatus of the character described having in combination a trackway above which a unit of railway rolling stock to be operated on may be retained in position principally by its own weight, a trackway extending parallel to said first-named trackway, a high speed friction saw unit movably mounted on said last-named trackway, means for adjusting said saw to operate in different cutting planes, means for moving said saw along said trackway, and means for traversing said saw at right angles to said trackway.

3. An apparatus of the character described having in combination a trackway above which a unit of railway rolling stock to be operated on may be retained in position principally by its own weight, a trackway extending parallel to said first named trackway, a high speed friction saw unit movably mounted on said last-named trackway, and means for traversing said saw at right angles vertically and horizontally to said second trackway.

4. An apparatus of the character described having in combination a trackway above which a unit of railway rolling stock to be operated on may be retained in position principally by its own weight, a trackway extending parallel to said first-named trackway, on either side thereof, a high speed friction saw unit movably mounted on each of said last-named trackways, and means for traversing said saw at right angles to said second trackways.

5. An apparatus of the character described having in combination a trackway above which a unit of railway rolling stock, the body of which is to be reduced to sections, may be retained in position principally by its own weight, a trackway extending parallel to said first-named trackway, a cutting unit movably mounted on said last-named trackway, means for traversing said unit at right angles to said second trackway, and means beneath the horizontal plane of said first-named trackway for receiving severed sections of said unit of rolling stock, and conveying them to a predetermined point.

6. An apparatus of the character described having in combination a trackway above which a unit of railway rolling stock, the body of which is to be reduced to sections, may be retained in position principally by its own weight, a trackway extending parallel to said first-named trackway, a cutting unit movably mounted on said last-named trackway, means for traversing said unit parallel to and at right angles to said second trackway, and means beneath the horizontal plane of said first-named trackway for receiving severed sections of said unit of rolling stock and conveying them to a predetermined point.

7. An apparatus of the character described having in combination a trackway above which a unit of railway rolling stock, the body of which is to be operated upon, may be retained in position principally by its own weight, a trackway positioned in a horizontal plane above said first-named trackway, a high speed friction saw unit movably mounted on said last-named trackway, means for traversing said saw at right angles to said second trackway.

8. An apparatus of the character described having in combination a trackway above which a unit of railway rolling stock, the body of which is to be operated upon, may be retained in position principally by its own weight, a trackway positioned in a horizontal plane above said first-named trackway, a high speed friction saw unit movably mounted on said last-named trackway, means for changing the angular position of said saw to operate in different cutting planes, and means for traversing said saw parallel to and at right angles to said second trackway.

9. In a method of reducing a large bulky section of railway rolling stock to sections of smaller size while supported and retained in position principally by its own weight, the step of moving a high speed friction saw thereagainst, and traversing said saw relative to said large bulky section to form a line of separation therein.

10. In a method of reducing a unit of railway rolling stock to sections while supported and retained in position, principally by its own weight, the step of moving a high speed friction saw thereagainst, and traversing said saw relative to said unit to form lines of separation therein.

11. In a method of reducing a unit of railway rolling stock to sections while supported and retained in position, principally by its own weight, the step of moving a high speed friction saw thereagainst in two directions successively to sever plate-like sections therefrom.

12. In a method of reducing a unit of railway rolling stock to sections while supported and retained in position, principally by its own weight, the step of moving a high speed friction saw thereagainst in three directions successively to sever plate-like sections therefrom.

Signed by me this 27th day of June, 1927.

WILLIAM S. DIETRICH.